United States Patent
Bogwicz et al.

[11] Patent Number: 5,892,349
[45] Date of Patent: Apr. 6, 1999

[54] CONTROL CIRCUIT FOR TWO SPEED MOTORS

[75] Inventors: Robert R. Bogwicz, Rochester; John E. Durkee, Wayland; Jason S. Anderson, Rochester, all of N.Y.

[73] Assignee: Therm-O-Disc, Incorporated, Mansfield, Ohio

[21] Appl. No.: 741,209

[22] Filed: Oct. 29, 1996

[51] Int. Cl.[6] .................................. H02P 1/48; H02P 1/44
[52] U.S. Cl. ..................... 318/772; 318/774; 318/779; 318/786
[58] Field of Search .................... 318/700–832, 318/138, 139, 245, 254, 439

[56] References Cited

U.S. PATENT DOCUMENTS

| | | |
|---|---|---|
| 3,414,789 | 12/1968 | Prouty . |
| 3,740,631 | 6/1973 | Fricker et al. . |
| 4,047,082 | 9/1977 | Scheuer et al. . |
| 4,254,343 | 3/1981 | Miller ................................... 318/778 |
| 4,375,613 | 3/1983 | Fuller et al. . |
| 4,443,749 | 4/1984 | Douthart et al. ..................... 318/774 |
| 4,453,118 | 6/1984 | Phillips et al. ...................... 318/779 |
| 4,467,257 | 8/1984 | Douthart et al. ..................... 318/774 |
| 4,605,888 | 8/1986 | Kim . |
| 4,622,506 | 11/1986 | Shemanske et al. . |
| 4,623,829 | 11/1986 | Smith et al. ......................... 318/793 |
| 4,658,195 | 4/1987 | Min . |
| 4,670,697 | 6/1987 | Wrege et al. ........................ 318/786 |
| 4,751,449 | 6/1988 | Chmiel ................................ 318/786 |
| 4,751,450 | 6/1988 | Lorenz et al. ....................... 318/786 |
| 4,804,901 | 2/1989 | Pertessis et al. .................... 318/786 |
| 4,823,067 | 4/1989 | Weber .................................. 318/799 |
| 4,862,053 | 8/1989 | Jordan et al. . |
| 5,483,139 | 1/1996 | Welles, II . |
| 5,514,943 | 5/1996 | Shapess ............................... 318/772 |
| 5,528,120 | 6/1996 | Brodetsky ........................... 318/785 |

FOREIGN PATENT DOCUMENTS

1272439  7/1968  Germany .

*Primary Examiner*—Paul Ip
*Attorney, Agent, or Firm*—Jones,Day,Reavis & Pogue

[57] ABSTRACT

A control circuit for an electric motor having start, low speed and high speed windings reactivates the start winding at different reduced motor speeds depending upon whether the motor is running on the low speed winding or the high speed winding. Reactivation of the start winding while the motor is running on the low speed winding automatically deactivates the low speed winding and activates the high speed winding.

21 Claims, 4 Drawing Sheets

CONTROL CIRCUIT FOR TWO SPEED MOTORS

BACKGROUND OF THE INVENTION

This application relates to the art of control circuits and, more particularly, to control circuits for electric motors. The invention is particularly applicable for use with capacitor start two speed motors and will be described with specific reference thereto. However, it will be appreciated that the invention has broader aspects and can be used with other motors.

Two speed electric motors having a start winding controlled by a centrifugal switch provide reactivation of the start winding at only one reactivation speed regardless of whether the motor is operating on the high speed winding or on the low speed winding. It would be desirable to have a control arrangement for providing reactivation of the start winding at two different reduced motor speeds depending upon whether the motor is operating on the high speed winding or on the low speed winding.

SUMMARY OF THE INVENTION

A control circuit for a two speed motor reactivates the motor start winding at two different reduced motor speeds depending upon whether the motor is running on its high speed winding or on its low speed winding.

In a preferred arrangement, reactivation f the start winding while the motor is running on its low speed winding automatically deactivates the low speed winding and activates the high speed winding.

The control circuit includes a low speed detector for detecting whether the low speed winding is active.

The control circuit of the present application senses motor current, which correlates to motor speed, for activating or deactivating the motor start winding.

In one arrangement, the control circuit monitors a reference value correlated to motor power supply voltage and a sensed value correlated to motor current. The reference and sensed values are compared to activate and deactivate the start winding.

The reference and sensed values are compared by a comparator that changes states to activate and deactivate the start winding. When the sensed value exceeds the reference value, the comparator goes high to activate the start winding. When the reference value exceeds the sensed value, the comparator goes low to deactivate the start winding.

The sensed value is amplified, and the amplifier has different gain depending on the active motor windings. The amplifier gain is low when both the start and high speed windings are active, is intermediate when only the high speed winding is active, and is high when only the low speed winding is active.

An ac relay deactivates the low speed winding and activates the high speed winding when the motor is operating on the low speed winding and the control circuit calls for activation of the start winding. The relay preferably is an alternating current actuated relay that requires a relay coil voltage of line voltage magnitude for operation.

It is a principal object of the present invention to provide an improved control circuit for two speed motors.

It is also an object of the invention to provide a control circuit that reactivates a motor start winding at two different reduced motor speeds depending upon whether the motor is running on its low speed winding or its high speed winding.

It is another object of the invention to provide a control circuit that detects whether the low speed winding is active when the start winding is activated or reactivated. If it is, the control circuit automatically deactivates the low speed winding and activates the high speed winding upon activation of the start winding.

It is a further object of the invention to provide a control circuit having an alternating current actuated relay for deactivating the low speed run winding and activating the high speed run winding when the start winding is activated while the low speed run winding is active.

It is an additional object of the invention to provide a two speed motor control circuit with an amplifier that has a highest gain when only the low speed run winding is active, an intermediate gain when only the high speed run winding is active, and a lowest gain when both the start winding and the high speed run winding are active.

DESCRIPTION OF A PREFERRED EMBODIMENT

Figure 1A:
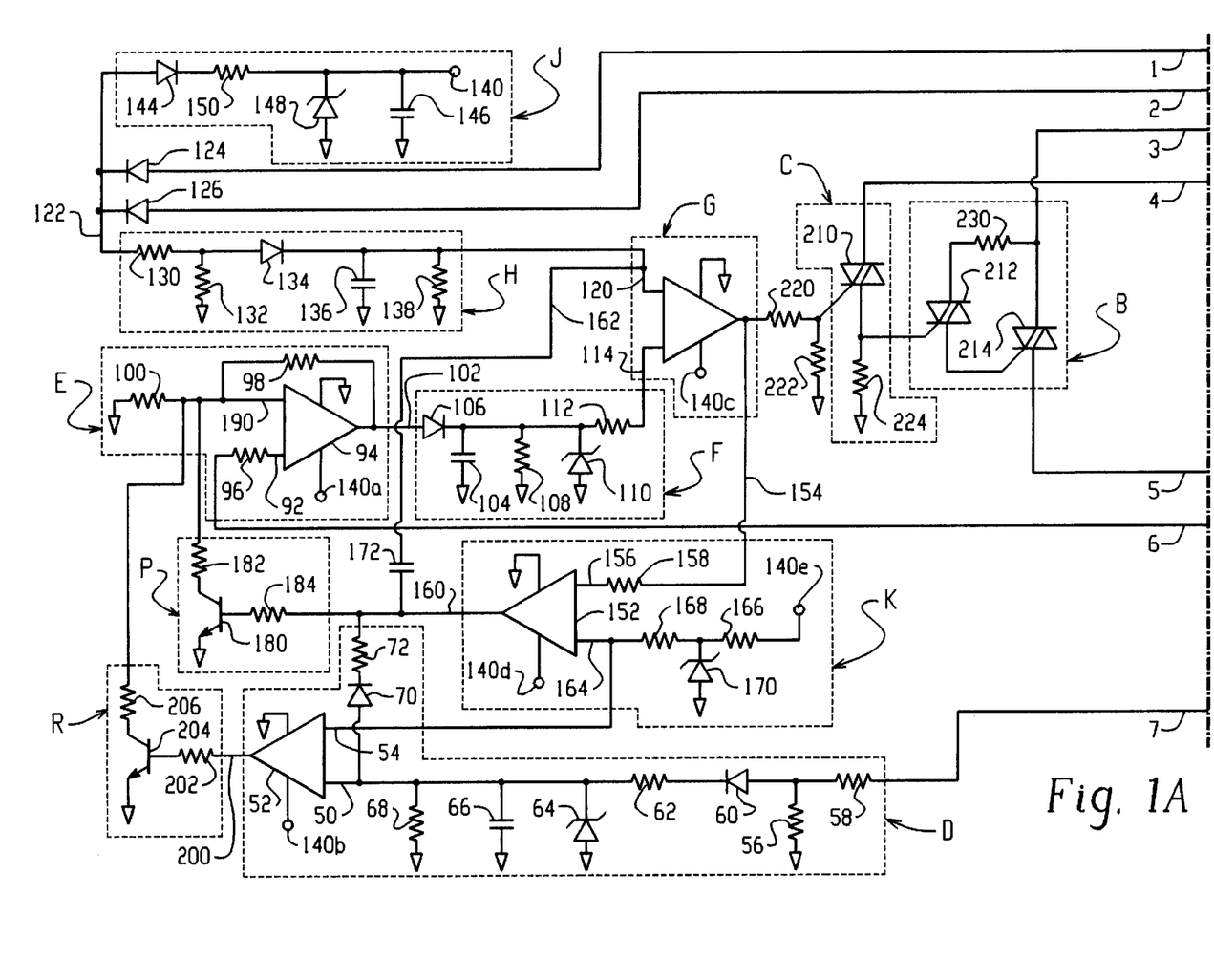
FIGS. 1A and 1B show a control circuit schematic in accordance with the present application.
Figure 1B:
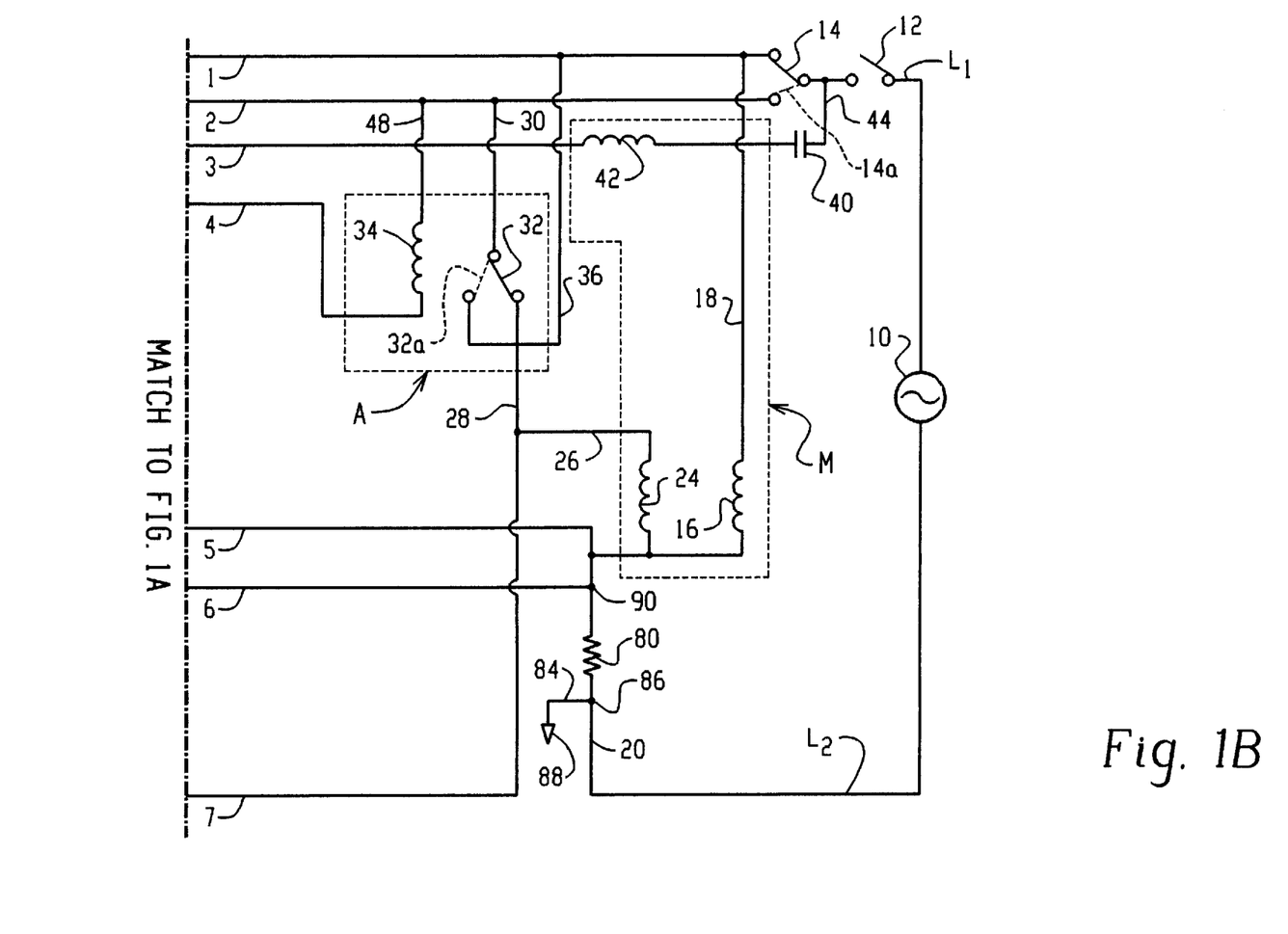

Referring now to the drawing, wherein the showings are for purposes of illustrating a preferred embodiment of the invention only and not for purposes of limiting same, numerals 1–7 identify the circuit lines that are interrupted at the right side of FIG. 1A to provide a reference for a continuation of the same lines that are identified by the same numbers 1–7 at the left side of FIG. 1B.

A two speed capacitor start motor M is connected across lines L1 and L2 of an alternating current power supply 10 by a main switch 12 and a speed selector switch having high and low speed settings 14 and 14a.

The solid line high speed position 14 of the speed selector switch connects line L1 to line 1 for operating motor M at its high speed setting.

The dotted line position 14a of the speed selector switch connects line L1 to line 2 for operating motor M at its low speed setting.

Motor M includes a high speed run winding 16 connected by line 18 to line 1 and by line 20 to line L2. Motor M includes a low speed run winding 24 connected by lines 26, 28 to an alternating current relay A which is connected by line 30 to line 2. Relay A has a relay switch with a normally closed low speed run winding position 32 and is movable to normally open high speed run winding position 32a upon activation of relay coil 34. Relay A preferably is an alternating current actuated relay that requires a coil voltage of line voltage magnitude for operation.

With the speed selector switch in low speed position 14a connecting line L1 to line 2, low speed run winding 24 is activated through line 30, normally closed switch position 32 of relay A, line 28, line 26, and line 20 to line L2. Upon activation of relay coil 34, low speed run winding 24 is deactivated because normally closed relay switch position 32 opens when the relay contacts are moved to switch position 32a. With the speed selector switch remaining in low speed position 14a connected to line 2, high speed run winding 16 is then activated through line 30, relay switch position 32a, line 36 connected to line 1, line 18 and line 20 to line L2. Deactivation of relay A automatically connects the relay switch back in series with low speed run winding 24 by movement of the relay switch from position 32a back to position 32.

Motor M includes a start winding 42, and a capacitor 40 connected in series with the start winding provides a phase displacement of approximately 90° between the current in start winding 42 and the current in run windings 16. Capacitor 40 and start winding 42 are connected by line 44 to line L1.

An electronic start switch B in series with start winding 42 activates and deactivates start winding 42. Electronic start switch B is controlled by an electronic switch C that is in series with relay coil 34 connected by line 48 to line 2. Electronic switch C is turned on to activate relay coil 34 and to turn electronic start switch B on for activating start winding 42.

When the control circuit calls for activation of start winding 42 while motor M is operating on low speed run winding 24 through speed selector switch 14a, electronic switch C turns on to activate relay coil 34 and move the relay switch from position 32 to position 32a for deactivating low speed run winding 24 and activating high speed run winding 16. At the same time, turning on electronic switch C also turns on electronic start witch B for activating start winding 42.

With the arrangement described, high speed run winding 16 is always activated when start winding 42 is activated, regardless of whether the motor was operating on the high or low speed run winding when the control circuit called for activation of the start winding.

When the motor is back up to speed, the control circuit will turn electronic switch C off to deactivate relay A and turn switch B off to deactivate start winding 42. The relay switch then returns to position 32 from position 32a for reconnecting low speed run winding 24 and disconnecting high speed run winding 16.

When the speed selector switch is in solid line high speed position 14 connecting line L1 to line 1 for operating motor M on high speed run winding 16, the control circuit turns electronic switch B on and off to activate and deactivate start winding 42 for initially starting the motor and for maintaining proper motor speed. Turning electronic switch C on does not activate relay A because the circuit for relay coil 34 through line 48 to line 2 and back to line L1 is interrupted when the speed selector switch is in its solid line high speed position 14 connecting line L1 to line 1.

The control circuit of the present application reactivates start winding 42 at different reduced motor speeds depending upon whether the motor is running on high speed run winding 16 or on low speed run winding 24. This is accomplished in part by providing a low speed run winding detector D for determining whether low speed run winding 24 is active, and by providing an amplifier with different gain depending upon which windings are active.

Low speed run winding detector D is connected by lines 7 and 28 to normally closed relay switch position 32. When a voltage greater than 90 volts ac is present at normally closed relay switch position 32, the resulting dc voltage provided by detector D at positive input 50 to comparator 52 exceeds the voltage at negative input 54 to comparator 52, and the output of comparator 52 goes high. This adjusts the circuit by providing an amplifier with higher gain for reactivating the start winding at a lower motor speed than when motor M is running on its high speed run winding. This aspect of the control circuit will be described in more detail as the description proceeds.

Low speed run winding detector D includes resistors 56, 58 that form a voltage divider for reducing the magnitude of the line voltage to a reference value. Diode 60 rectifies line voltage into a positive pulsating dc voltage and is in series with a current limiting resistor 62. A zener diode 64 clamps the desired dc voltage value. Capacitor 66 filters the positive pulsating voltage into a steady dc voltage, and resistor 68 provides a controlled discharge path for filter capacitor 66. Diode 70 and resistor 72 provide a path for rapid discharge of capacitor 66 when relay A switches from its normally closed position 32 to its normally open position 32a.

A sense resistor 80 is connected in series with motor M in line 20. The sense resistor preferably is a short length of wire whose resistance change with temperature is comparable to the change in resistance of the motor windings with temperature. In one arrangement that has been tested, the wire was a 15-inch length of 18 gauge copper wire, with the wire gauge corresponding to American Wire Gauge Standards. It will be recognized that the wire can be of other lengths, gauges or metals, and that sense resistors other than a short length of wire can be used. The sense resistor preferably is positioned inside of the motor housing, and most preferably is embedded in the motor windings or otherwise located in close proximity thereto for exposure to substantially the same temperature as the motor windings. However, other locations for the sense resistor are possible, including external of the motor housing, as long as the temperature of the sense resistor will approximate the motor winding temperature or otherwise have a correlation thereto.

Figure 2:
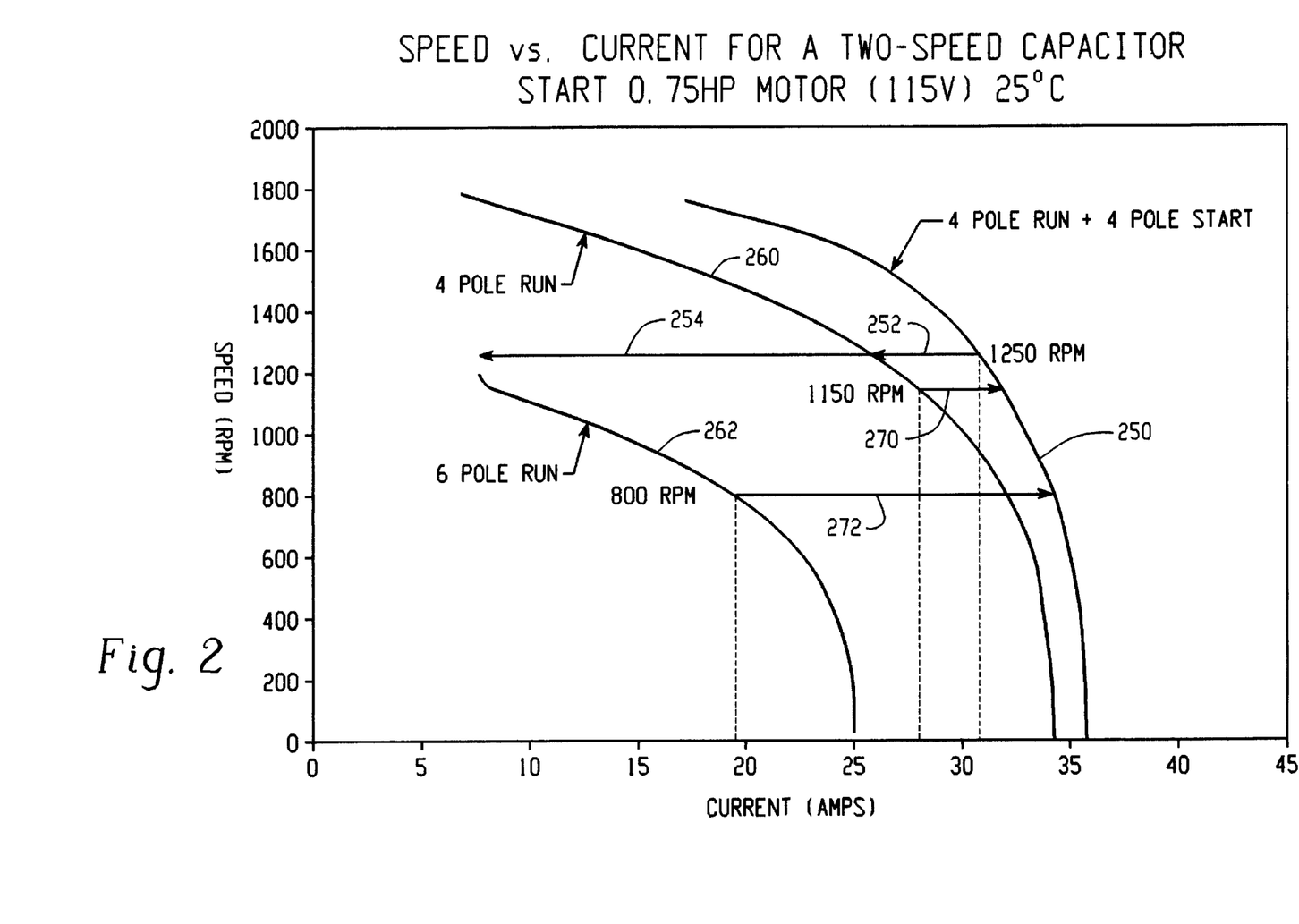
FIG. 2 is a graph showing the correlation between motor speed and motor current with different windings active, along with start winding deactivation and reactivation points.
Figure 3:
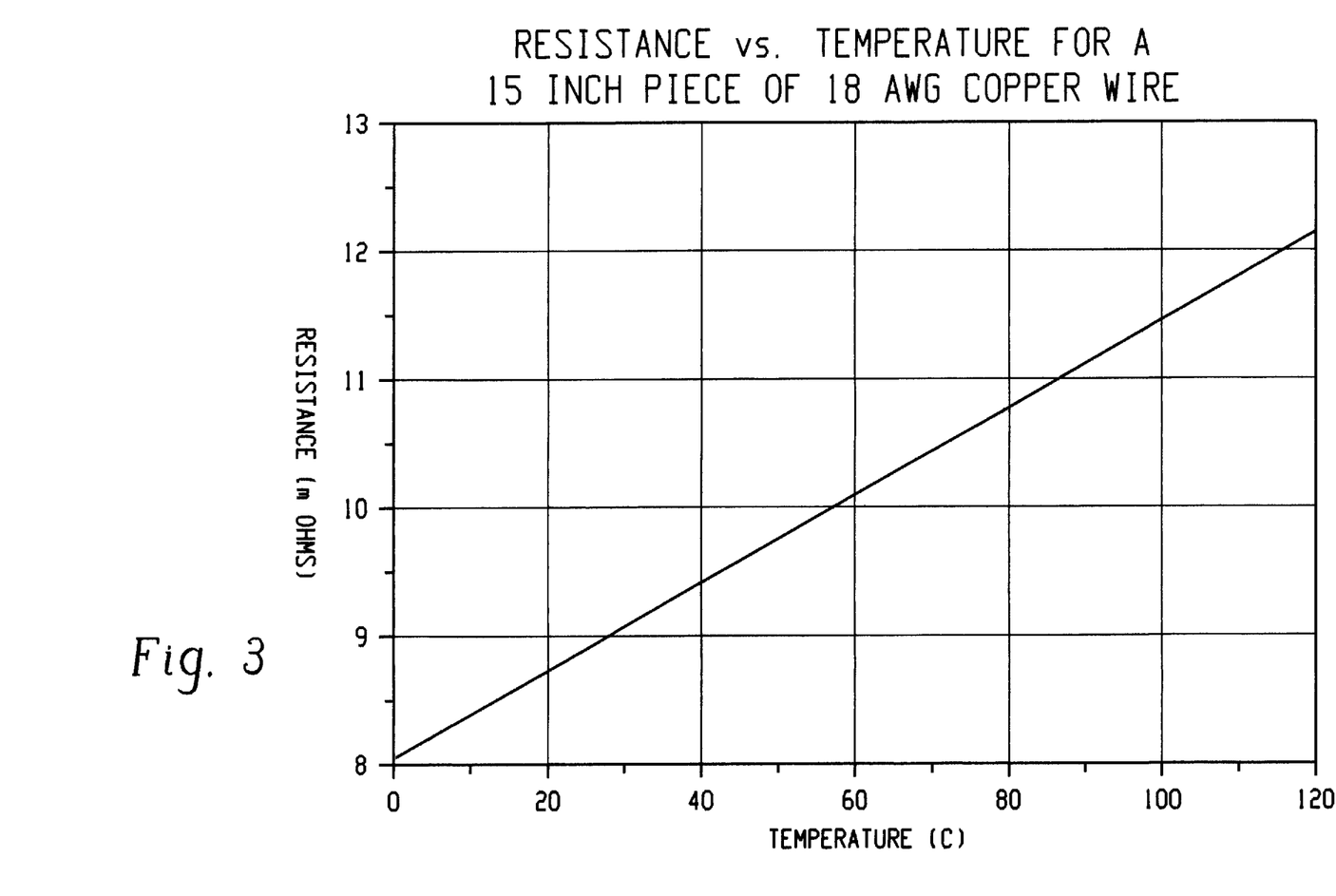
FIG. 3 is a graph showing the relationship between resistance and temperature for a motor current sense resistor used in the circuit of the present application.

The current running through motor M correlates to the rotational speed of the motor as shown in the graph of FIG. 2. The motor current also runs through sense resistor 80, and measuring the voltage drop across sense resistor 80 is a way of measuring motor current or a sensed value that correlates to motor current. Because the voltage drop correlates to motor current which in turn correlates to motor speed, the voltage drop also correlates to motor speed.

The motor current changes with variations in the temperature of the motor windings. However, motor current changes that are due solely to temperature variations do not appreciably affect motor speed. A control circuit that is sensitive to such changes in motor current could interpret them as motor speed changes and significantly contribute to inaccuracies in the motor rpm trip points at which the start winding is activated and deactivated.

The resistance of sense resistor 80 varies with temperature and is positioned for exposure to substantially the same temperature environment as the motor windings. This provides automatic compensation for current changes that are due to temperature variations because the current decreases with increasing resistance in accordance with Ohms law which states that V=IR, where V is the voltage, I is the current and R is the resistance. Therefore, the voltage drop across sense resistor 80 remains substantially constant with changes in motor current that are caused solely by temperature variations in the motor windings and that do not appreciably affect motor speed.

A line 84 connected at point 86 on the opposite side of sense resistor 80 from motor M terminates in an arrowhead 88 to designate a reference potential. All of the other arrowheads in the circuit of FIG. 1 are referenced to the same potential as arrowhead 88.

Line 6 is connected at point 90 between motor N and sense resistor 80, and to positive input 92 of operational amplifier 94 in amplifier E. The voltage across sense resistor 80 is amplified by amplifier E for conversion to a dc voltage. The input voltage at positive input 92 to operational amplifier 94 is a sine wave in the millivolt range and the output is a positive pulsating dc voltage in the single digit volt range. Amplifier E includes an impedance matching resistor 96, and resistors 98, 100 that set the amount of voltage gain provided by the amplifier.

A peak detector F is connected by line 102 to the output of amplifier E and converts the pulsating positive dc voltage from amplifier E to a steady dc voltage. The magnitude of the steady dc voltage is close to the peak of the pulsating dc voltage from amplifier E and correlates to the speed of motor M. Peak detector F includes a capacitor 104 that filters the positive pulsating dc voltage into a steady dc voltage, and a diode 106 prevents capacitor 104 from discharging back into amplifier E. Resistor 108 provides a controlled discharge path for capacitor 104, and zener diode 110 clamps the desired dc voltage value. Input impedance matching resistor 112 is in line 114 connecting the output of peak detector F to the positive input of comparator G.

The negative input of comparator G is connected by line 120 with voltage reference H that is connected by line 122 to lines 1 and 2 through diodes 124, 126. Voltage reference H includes resistors 130, 132 that form a voltage divider for reducing the magnitude of line voltage to a reference voltage value. The reference voltage provided by voltage reference H to the negative input of comparator G varies in magnitude with variations in the magnitude of line voltage so that the ratio of the reference voltage to line voltage remains substantially constant. Variations in the magnitude of line voltage also cause changes in motor current and this in turn causes changes in the voltage drop across sense resistor 80 that are substantially proportional to the changes in the reference voltage. This provides the control circuit with automatic compensation for changes in motor current caused by line voltage variations because increases and decreases in the reference voltage are substantially matched by corresponding increases and decreases in the voltage drop across sense resistor 80. This improves the accuracy of the motor rpm trip points at which the start winding is deactivated and reactivated. The actual motor rpm trip points do not deviate by more than around plus or minus 150 rpm from the optimum motor rpm trip points.

Voltage reference H includes a diode 134 that rectifies the sine wave into a positive pulsating dc voltage. Capacitor 136 filters the positive pulsating dc voltage into a steady dc voltage, and resistor 138 provides a controlled discharge path for capacitor 136.

A dc power supply J connected to lines 1 and 2 converts ac line voltage to a dc power supply for circuit components requiring a dc voltage. A dc voltage 140 provided by dc power supply J is connected to other circuit components as indicated at 140a, 140b, 140c, 140d and 140e. Power supply J includes a diode 144 that rectifies line voltage into a positive pulsating dc voltage. Capacitor 146 filters the positive pulsating voltage into a steady dc voltage at 140, while zener diode 148 clamps the desired dc voltage value. A resistor 150 in series with diode 144 is a current limiting and voltage dropping resistor.

An inverter K is provided to invert the output of comparator G by use of an inverting comparator 152. Line 154 connects the output of comparator G to the negative input 156 of inverting comparator 152 through an impedance matching resistor 158.

Output line 160 from inverting comparator 152 is connected by line 162 to negative input line 120 of comparator G. Positive input line 164 of inverting comparator 152 includes a current limiting resistor 166 and an impedance matching resistor 168. Zener diode 170 clamps the positive input to a desired dc voltage value and sets the reference voltage for inverter K.

When the output of comparator G goes low, the connection through line 154 to the negative input at 156 of inverting comparator 152 drops below the regulated reference positive input at 164 and causes the output of inverting comparator 152 to go high. Capacitor 172 in line 162 provides hysteresis and pulls the negative input to comparator G higher when the output of inverter K goes high. This helps to prevent chattering of comparator G during switching, i.e., when comparator G changes between its high and low states. When the output of inverter K goes low, capacitor 172 pulls the negative input to comparator G lower and helps prevent chattering of comparator G when it changes to its opposite state.

A start winding gain adjuster P is provided for adjusting the gain of amplifier E when the start winding is inactive. When motor start winding 42 is active, there is a different correlation between motor current and motor speed compared to when start winding 42 is inactive as shown in the graph of FIG. 2. The purpose of gain adjuster P is to adjust the gain of amplifier E for achieving proper motor rpm and motor current switching points for activating and deactivating start winding 42.

When comparator G goes high to activate start winding 42, npn transistor 180 of gain adjuster P is off because the input voltage on line 154 to negative input 156 of inverting comparator 152 is higher than the reference voltage to positive input 164 and the output on line 160 goes low. Under these conditions, gain adjuster P is inoperative while start winding 42 is active so there is no adjustment in the gain of amplifier E.

The output of comparator G goes low to deactivate start winding 42, and the reference voltage on line 154 to negative input 156 of inverting comparator 152 is below the reference voltage at positive input 164. This causes inverting comparator 152 to go high and turns transistor 180 on through current limiting resistor 184 connected with the base of the transistor. Resistor 182 of gain adjuster P is then connected in parallel with resistor 100 of amplifier E to provide a higher voltage gain for amplifier E due to the relationship between resistors 100 and 182. When transistor 180 is off, resistor 182 has no effect on amplifier E.

A low speed run winding gain adjuster R is connected to the output of low speed detector D and the negative input 190 of operational amplifier 94. When the switch of relay A is in its normally closed solid line position 32 for operating motor M on its low speed run winding 24, the relationship between current and speed changes as shown in FIG. 2. Gain adjuster R adjusts the gain of amplifier E when low speed run winding 24 is active to obtain proper switching points. The switching points being the motor rotational speeds and motor currents at which the start winding is activated and deactivated.

When the switch of relay A is in its normally closed position 32 with switch 14a closed for running motor M on low speed run winding 24, the voltage sensed value at positive input 50 of comparator 52 is larger than the voltage reference value at negative input 54. Therefore, the output of comparator 52 on line 200 through current limiting resistor 202 goes high and turns npn transistor 204 on. This connects resistor 206 in parallel with resistor 100 in amplifier E to provide a higher voltage gain due to the relationship between resistors 100, 206.

When the motor speed selector switch is in solid line high speed position 14, or when the relay switch is in position 32a, low speed detector D detects a voltage less than 90 volts ac at relay switch position 32. Therefore, the voltage at positive input 50 of comparator 52 is less than the reference voltage at negative input 54, and the output of comparator 52 goes low so that transistor 204 remains off and gain adjuster R has no effect on amplifier E when the low speed winding is inactive.

The output of comparator G goes high when the control circuit calls for activation of the start winding. Logic triac 210 of relay electronic switch C is then turned on to activate relay A and to turn on logic triac 212 in electronic switch B. When logic triac 212 turns on, this also turns on high current snubberless triac 214 to activate start winding 42.

A current limiting resistor 220 is provided between the output of comparator G and the gate of logic triac 210. A pull down resistor 222 helps to eliminate false triggering of logic triac 210. Pull down resistor 224 helps to eliminate false triggering of logic triac 212 in electronic switch B. Current limiting resistor 230 in electronic switch B limits the amount of current flow into the gate of high current snubberless triac 214. Logic triacs 210, 212 require substantially lower gate drive current than high current snubberless triac 214.

The sensed value provided by the voltage drop across sense resistor 80 is constantly monitored, and amplifier E along with peak detector F provide a sensed value input to the positive input of comparator G. A reference value is provided to the negative input of comparator G from reference voltage H that monitors line voltage. When the positive input sensed value to comparator G from amplifier E and peak detector F is larger than the negative input reference value to comparator G from voltage reference H, the output of comparator G goes high and this turns on electronic start switches B and C to activate relay A and start winding 42.

The magnitude of the output from peak detector F correlates to motor current because the voltage drop across sense resistor 80 correlates to motor current which in turn correlates to motor speed as shown in FIG. 2. The magnitude of the reference voltage provided by voltage reference H to the negative input of comparator G correlates to the magnitude of line voltage. These relationships provide improved accuracy in the motor rpm trip points at which start winding 42 is activated or deactivated when changes in motor current are caused by line voltage variations.

When motor M is turned on with the motor speed selector switch in its solid line high speed position 14, the current running through high speed run winding 16 increases until the voltage drop across sense resistor 80 is sufficient for amplifier E and peak detector F to provide a positive input sensed value to comparator G that causes comparator G to go high. Although electronic switch C is turned on, relay A is not activated because it has no power supply through line 2 when the motor speed selector switch is in its solid line high speed position 14. Comparator G going high also turns on electronic switch B to activate start winding 42. The motor then ramps up to speed with both high speed run winding 16 and start winding 42 active.

When comparator G goes high to activate the start winding, the output of inverter K goes low to turn gain adjuster P off so that the circuit automatically compensates for the higher motor current due to both high speed run winding 16 and start winding 42 being active. The current through high speed run winding 16 and start winding 42 decreases as the motor reaches its desired predetermined rotational speed. The sensed value provided by the voltage drop across sense resistor 80 also decreases with decreasing motor current until the positive input at 114 to comparator G from amplifier E and peak detector F falls below the reference voltage to negative input 120 of comparator G and causes the output of comparator G to go low. This turns off electronic switches B, C and deactivates start winding 42. This also causes the output of inverter K to go high and turns on gain adjuster P.

If the rotational speed of the motor slows down, the motor will draw more current and the voltage drop across sense resistor 80 will again increase until the positive input to comparator G from amplifier E and peak detector F is once more sufficient to turn on electronic switch B for reactivating start winding 42.

When motor M is turned on with the motor speed control switch in its low speed position 14a, low speed run winding detector D detects the voltage at normally closed switch position 32 of relay A, and the output of comparator 52 in detector D goes high to activate low speed gain adjuster R. At the same time, current through low speed run winding 24 and sense resistor 80 increase until the voltage drop across sense resistor 80 provides an input to comparator G from amplifier E and peak detector F to cause the output of comparator G to go high. Detector D and gain adjuster R adjust the gain of amplifier E to account for different currents running through motor M depending upon whether high speed run winding 16 or low speed run winding 24 is active. Gain adjuster R is inactive when low speed run winding 24 is inactive.

With low speed run winding 24 active and the output of comparator G going high to activate start winding 42 through switch B, electronic switch C is also turned on to activate ac relay A. This moves the relay switch from normally closed position 32 to position 32a for deactivating low speed run winding 24 and activating high speed run winding 16. Both gain adjusters P and R are turned off. The motor then ramps up to speed on high speed run winding 16 and start winding 42. When motor M reaches its desired predetermined rotational speed, the current running through the motor decreases until the voltage drop across sense resistor 80 is low enough to provide a positive input to comparator G from amplifier E and peak detector F that is less than the negative input from the voltage reference value and causes the output of comparator G to go low. This turns off electronic relay switch C for deactivating relay A. The relay switch then returns to position 32 from position 32a to reactivate low speed run winding 24 and deactivate high speed run winding 16. The output of comparator G going low also opens electronic switch B to deactivate start winding 42, and both gain adjusters P and R are turned on. The motor will then run on low speed run winding 24 alone unless the motor slows down sufficiently to provide a current through low speed run winding 24 and sense resistor 80 resulting in a voltage drop that drives the output of comparator G high.

The motor has three different operating conditions. The first condition is when both high speed run winding and start winding 42 are active. In this condition, both gain adjusters P and R are inactive. This condition corresponds to curve 250 of FIG. 2 when the motor current is highest and the voltage drop across sense resistor 80 is largest. The second condition is when only the low speed run winding is active. In this condition, both gain adjusters P and R are active. This condition corresponds to curve 262 of FIG. 2 when the motor current is lowest and the voltage drop across sense resistor 80 is smallest. Under this condition, amplifier E is provided with the highest gain. The third condition is when only the high speed run winding is active. In this condition, gain adjuster P is active and gain adjuster R is inactive. Thus, amplifier E has less gain than in the second motor run condition. This third condition corresponds to curve 260 in FIG. 2 when the motor current is intermediate the motor current in the other two motor run conditions.

With reference to FIG. 2, when the motor is running on only the low speed run winding as represented by curve 262, both the low speed gain adjuster R and the start gain adjuster P are on to provide amplifier E with its greatest gain. When the motor is running on only the high speed run winding as represented by curve 260, low speed gain adjuster R is off and start gain adjuster P is on so that amplifier E has an intermediate gain. When the motor is running on both the start and high speed run windings as represented by curve 250, both of gain adjusters P and R are off and amplifier E has its lowest gain that is built into it with no boost from either gain adjuster P or R.

When the output of comparator G goes high, both start winding 42 and high speed run winding 16 are activated, low speed run winding 24 is deactivated and gain adjusters P and R are turned off. When the output of comparator G goes low, start winding 42 is deactivated, gain adjuster P is turned on and the motor continues to run on either high speed run winding 16 or low speed run winding 24 depending on the position of speed selector switch 14, 14a. Comparator G going low will turn on gain adjuster R if the speed selector switch is in position 14a for the low speed run winding, and will leave gain adjuster R off if the speed selector switch is in position 14 for the high speed run winding.

The output of comparator G goes high in response to higher motor currents running through sense resistor 80, and goes low in response to lower motor currents running through sense resistor 80.

With reference to FIG. 2, curve 250 shows the correlation between motor speed and motor current when both the start winding and the high speed run winding are active. At a motor speed of around 1,250 rpm, the start winding is deactivated and the motor current drops off as indicated by horizontal arrow lines 252, 254. The motor continues to run on only the high speed run winding represented by curve 260 or the low speed run winding represented by curve 262.

When the start winding is deactivated at a speed of around 1,250 rpm and the motor continues to run on only the high speed run winding, the motor speed continues to ramp up to an operating speed of around 1,600–1,800 rpm.

When the start winding is deactivated at a motor speed of around 1,250 rpm and the motor continues to run on only the low speed run winding, the motor speed ramps down slightly to an operating speed of around 1,000–1,200 rpm.

With the motor running on only the high speed run winding, a reduction in speed from the normal operating speed of around 1,600–1,800 rpm down to a reactivating speed of around 1,150 rpm will reactivate the start winding as depicted by horizontal arrow line 270 from curve 260 to curve 250 in FIG. 2.

With the motor running on only the low speed run winding at a normal operating speed of around 1,000–1,200 rpm, a reduction in speed down to a reactivating speed of around 800 rpm will reactivate the start winding as depicted by horizontal arrow line 272 from curve 262 to curve 250 in FIG. 2.

The different gain provided to amplifier E by gain adjuster P alone or by gain adjusters P and R combined makes it possible to reactivate the start winding at different motor speeds depending upon whether the motor is running on the high speed run winding or on the low speed run winding. It will be recognized that the trip points at which the start winding is activated and deactivated with reference to FIG. 2 are by way of example only and not by way of limitation. Many different trip points may be provided depending upon the application, and the trip points are approximate and may vary by at least plus or minus 150 rpm or even more.

Adjusting the gain of amplifier E provides an advantageous way of adjusting the motor speed trip points at which the start winding is deactivated and reactivated. The amplifier gain can be adjusted by changing the resistance value of resistors 100 and 182 in amplifier circuit E and gain adjuster circuit P. Adjusting the amplifier gain adjusts the magnitude of the difference between the sensed value across sense resister 80 and the sensed value input that is received by comparator G. This functions to adjust the magnitude of the motor current at which comparator G will go high or low, thereby adjusting the motor speed at which the start winding is deactivated and reactivated. Increasing the amplifier gain provides upward adjustment in the motor speeds at which the start winding is deactivated and reactivated. Because of the inverse relationship between motor speed and motor current, this corresponds to downward adjustment in the magnitude of the motor currents at which the start winding is deactivated and reactivated. Decreasing the amplifier gain has the opposite effect. Changing the resistance value of resistor 206 in low speed gain adjuster H will further adjust the motor speed at which the start winding is activated when the motor is operating on only its low speed run winding. A change in resistor 206 that increases the gain of amplifier E will increase the motor speed and lower the motor current at which the start winding is activated when the motor is operating on only the low speed run winding. Once the start winding is activated, gain adjuster R is turned off. Because gain adjuster P is operating on only its low speed run winding, changing resistor 182 also affects the motor speed at which the start winding will be activated when the motor is operating on only its low speed run winding.

In the arrangement of the present application, relay A defines a control switch for deactivating the low speed run winding and activating the high speed run winding upon reactivation of the start winding when the motor is connected through the speed selector switch for running on the low speed run winding.

The control circuit provides a start winding control that reactivates the start winding at different motor speeds depending upon whether the motor is connected through the speed selector switch for running on its low speed run winding or its high speed run winding. This is achieved by providing higher gain to the control amplifier when the motor is connected to run on its low speed run winding. The low speed gain is activated by a detector that detects when the low speed run winding is active.

The amplifier and peak detector effectively provide a sensing circuit for sensing a sensed value that correlates to motor current and providing a sensed value input to the comparator. The voltage reference provides a reference value to the comparator for comparison with the sensed value to activate or deactivate the start winding.

The graph of FIG. 2 provides a reference for the motor currents at which the output of the comparator goes high or low to activate or deactivate the start winding. The comparator goes high at different motor currents that correlate to different reduced motor speeds depending on whether the high or low speed run winding is connected. This is because connection of the low speed winding activates a low speed gain adjuster for the amplifier.

With reference to the low speed curve 262, both the low speed gain adjuster and the start gain adjuster are active, and the output of the comparator will go high at any motor current greater than about 19 amps. This will deactivate the low speed winding, and turn off both the low speed gain adjuster and the start gain adjuster, while activating the start winding and the high speed winding, and the total motor current moves to curve 250.

With reference to high speed curve 260, gain adjuster P is on and gain adjuster R is off, and the output of the comparator will go high at any motor current greater than about 28 amps. This will activate the start winding and the total motor current moves to curve 250 while gain adjuster R remains off and gain adjuster P is turned off.

With both the start winding and the high speed winding connected as represented by curve 250, the output of the comparator is high and both the start gain adjuster P and low speed gain adjuster R are inactive so that the comparator output will go low at any motor current less than about 31 amps. This will deactivate the start winding and reactivate start gain adjuster P, and the total motor current decreases to either curve 260 or curve 262 depending on whether the speed selector switch is in its high or low speed position. If it is in the low speed position, low speed gain adjuster R will also be turned on.

Voltage reference H provides a reference value that correlates to line voltage and the voltage drop across sense resistor 80 provides a sensed value that correlates to motor current which in turn correlates to motor speed. The reference and sensed values provide reference and sensed inputs to comparator G.

The control circuit of the present application activates the start winding at any motor speed between zero and a low reactivating speed when the low speed winding is active, and activates the start winding at any motor speed between zero and a high reactivating speed when the high speed winding is active. For the specific motor and control circuit arrangement used for the graph of FIG. 2, the low reactivating speed is around 800 rpm and the high reactivating speed is around 1,150 rpm. These speeds are given only by way of example and will vary depending on the motor and the application in which the motor is used.

Although a length of copper wire has been described for the sense resistor, it will be recognized that motor current can be sensed in other ways, such as by the use of a current transformer, a Hall effect sensor or other current sensing devices. It will also be appreciated by those skilled in the art that the triacs for the electronic switches could be replaced by solid state relays of either zero or non-zero crossing types. Instead of triacs or solid state relays, it is also possible to use zero crossing detectors or circuits, as well as opto-isolated triacs. It will further be recognized that the discreet analog components shown and described could be replaced by, and incorporated in, an application specific integrated circuit. Obviously, the control circuit could also be a micro controller with appropriate associated software for performing the described control functions in response to sensed motor current.

Although the invention has been shown and described with respect to a preferred embodiment, it is obvious that equivalent alterations and modifications will occur to others skilled in the art upon the reading and understanding of this specification. The present invention includes all such equivalent alterations and modifications and is limited only by the scope of the claims.

We claim:

1. A control circuit for an electric motor having a single start winding, a low speed run winding and a high speed run winding, a selector switch for selectively activating either said low speed run winding or said high speed run winding, said motor being operable in a low speed range on said low speed run winding and in a high speed range on said high speed run winding, a sensed value generator that provides a sensed value that is correlated to motor speed, a start winding control that automatically responds to said sensed value to automatically reactivate the start winding at one reactivating speed when the motor speed decreases below said high speed range down to said one reactivating speed while running with said high speed run winding active in said high speed range above said one reactivating speed, said start winding control automatically responding to said sensed value to automatically reactivate the start winding at another reactivating speed when the motor speed decreases below said low speed range down to said another reactivating speed while running with said low speed run winding active in said low speed range above said another reactivating speed, said another reactivating speed being substantially lower than said one reactivating speed, and said start winding control automatically responding to said sensed value to automatically deactivate said start winding at a predetermined motor speed that is greater than said high reactivating speed.

2. The circuit of claim 1 wherein said control circuit includes a control switch that automatically deactivates said low speed run winding and automatically activates said high speed run winding upon reactivation of said start winding at said another reactivating speed.

3. The circuit of claim 2 wherein said control switch comprises an ac actuated relay.

4. The control circuit of claim 1 including a reference value generator that provides a reference value that is correlated to line voltage, and said start winding control comparing said reference and sensed values to provide automatic activation of said start winding at said one and another reactivating speeds and automatic deactivation of said start winding at said predetermined speed.

5. The circuit of claim 1 wherein said control circuit includes an amplifier for amplifying said sensed value and further including a gain adjustment that provides said amplifier with low gain when both said start and high speed run windings are active, with intermediate gain when only said high speed run winding is active, and with high gain when only said low speed run winding is active.

6. The circuit of claim 1 including an amplifier that amplifies said sensed value, start and run gain adjusters that selectively adjust the gain of said amplifier, both of said start and run gain adjusters being inactive when both said start and high speed run windings are active, said start gain adjuster being active when either of said high speed or low speed run windings are active, and said run gain adjuster being active only when said low speed run winding is active.

7. The circuit of claim 6 including a low speed detector that detects whether said low speed run winding is active to turn said run gain adjuster on and off.

8. The circuit of claim 1 including a low speed detector that detects whether said low speed run winding is active.

9. A motor control circuit for a motor having high speed and low speed windings and a single start winding, a selector switch having high and low speed positions for selectively activating either said high speed winding or said low speed winding, a start winding control that automatically activates said start winding at any motor speed between zero and a low reactivating speed when said low speed winding is active and automatically activates said start winding at any motor speed between zero and a high reactivating speed when said high speed winding is active, said high reactivating speed being substantially higher than said low reactivating speed, said start winding control automatically deactivating said start winding at a predetermined motor speed that is greater than said high reactivating speed, a sensed value generator that provides a sensed value that is correlated to motor speed, and said sensed value being monitored by said start winding control to provide automatic activation of said start winding at said low and high reactivating speeds and automatic deactivation of said start winding at said predetermined motor speed.

10. The control circuit of claim 9 wherein said sensed value is a sensed value signal and further including an amplifier that amplifies said sensed value signal, and an amplifier gain adjustment that provides said amplifier with low gain when both said start and high speed windings are active, with intermediate gain when only said high speed winding is active, and with high gain when only said low speed winding is active.

11. The control circuit of claim 9 including a reference value generator that provides a reference value that is correlated to line voltage, said sensed value being correlated to motor current, and said start winding control including a comparator for comparing said reference and sensed values to provide automatic activation of said start winding at said low and high reactivating speeds and automatic deactivation of said start winding at said predetermined speed.

12. The control circuit of claim 11 wherein said sensed value generator comprises a sense resistor in series with said motor and said sensed value comprises the voltage produced by motor current running through said sense resistor.

13. The control circuit of claim 12 wherein said sense resistor is positioned for exposure to substantially the same temperature environment as said motor windings.

14. The control circuit of claim 9 including a control switch selectively connectable to activate either said low speed winding or said high speed winding through said low speed position of said selector switch.

15. The control circuit of claim 14 wherein said control switch is automatically connected to deactivate said slow speed winding and to activate said high speed winding through said low speed position of said selector switch when said start winding is activated with said low speed winding active.

16. The control circuit of claim 14 wherein said control switch comprises an ac actuated relay.

17. A method of automatically controlling a single start winding of a two speed motor having low speed and high speed run windings through automatic operation of an electronic control circuit comprising the steps of activating the start winding and one of the run windings to start the motor rotating and bring it up to a predetermined speed, monitoring the motor speed or the value of a motor operating condition that correlates to motor speed, automatically deactivating the start winding when the motor is rotating at a predetermined speed, automatically reactivating the start winding when the motor slows down to a first speed that is lower than said predetermined speed while running on the high speed run winding at a high speed that is faster than the predetermined speed, and automatically activating the start winding when the motor slows down to a second speed that is lower than the first speed while running on the low speed run winding at a low speed that is slower than the high speed.

18. The method of claim 17 including the step of detecting whether the low speed run winding is active, and deactivating the low speed run winding while activating the high speed run winding upon activation of said start winding.

19. The method of claim 17 wherein said step of monitoring is carried out by monitoring a sensed value correlated to motor current and a reference value correlated to motor power supply voltage, and said steps of deactivating, reactivating and activating being carried out by comparing said sensed and reference values.

20. A control circuit for an electric motor having low and high speed run windings and a start winding that is activatable only in combination with said high speed run winding and not in combination with said low speed run winding, a selector switch for selectively activating either said low speed run winding or said high speed run winding, a sensed value generator that generates a sensed value that is correlated to motor speed, a start winding control that monitors said sensed value and automatically activates said start winding at any motor speed between zero and a first reactivating speed when said low speed run winding is active, that automatically activates said start winding at any motor speed between zero and a second reactivating speed that is higher than said first reactivating speed when said high speed run winding is active, and that automatically deactivates said start winding at a predetermined motor speed that is greater than said second reactivating speed, said start winding control including a detector that detects whether said low speed run winding is active and automatically deactivates said low speed run winding and automatically activates said high speed run winding upon activation of said start winding when said low speed run winding is active until the motor reaches said predetermined speed whereupon said start winding control automatically deactivates said start winding and either leaves said high speed run winding active if it was active when said start winding was activated or automatically deactivates said high speed run winding and automatically activates said low speed run winding if said low speed run winding was active when said start winding was activated.

21. A control circuit for an electric motor having low speed, high speed and start windings, a selector switch for selectively activating either said low or high speed winding, a sensed value generator that generates a sensed value signal that is correlated to motor speed, a control amplifier that amplifies said sensed value signal to provide an amplifier output, a low speed run winding detector and amplifier gain adjuster that automatically provides said amplifier with a first amplifier output when said low speed run winding is active and with a second amplifier output when said low speed run winding is inactive, and a start winding control that monitors said amplifier output and automatically activates said start winding at any motor speed between zero and a first reactivating speed in response to said first amplifier output and automatically activates said start winding at any motor speed between zero and a second reactivating speed that is greater than said first reactivating speed in response to said second amplifier output.

* * * * *